Dec. 30, 1941.   D. M. GOODRICH   2,268,249
PNEUMATIC TIRE
Filed April 14, 1939
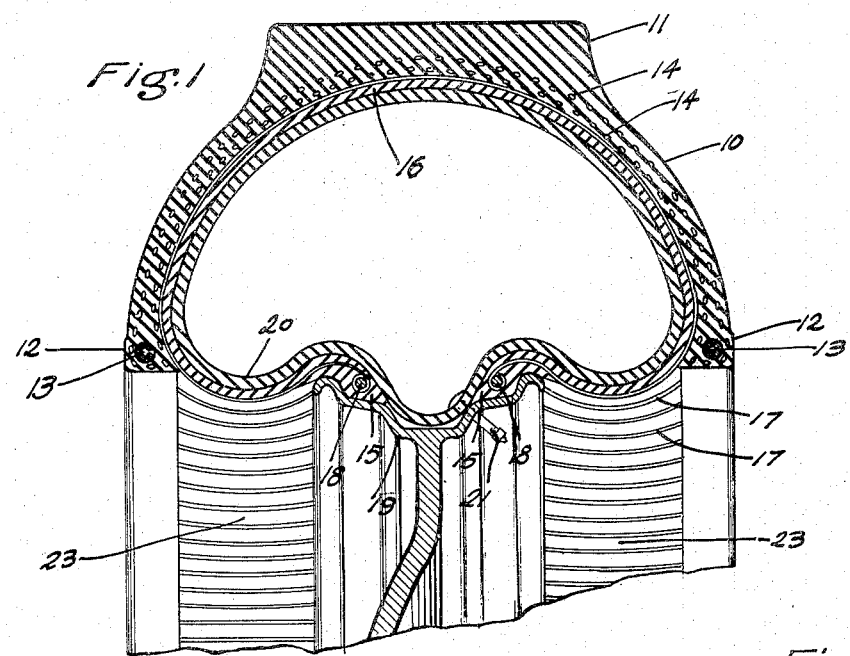
Fig. 1
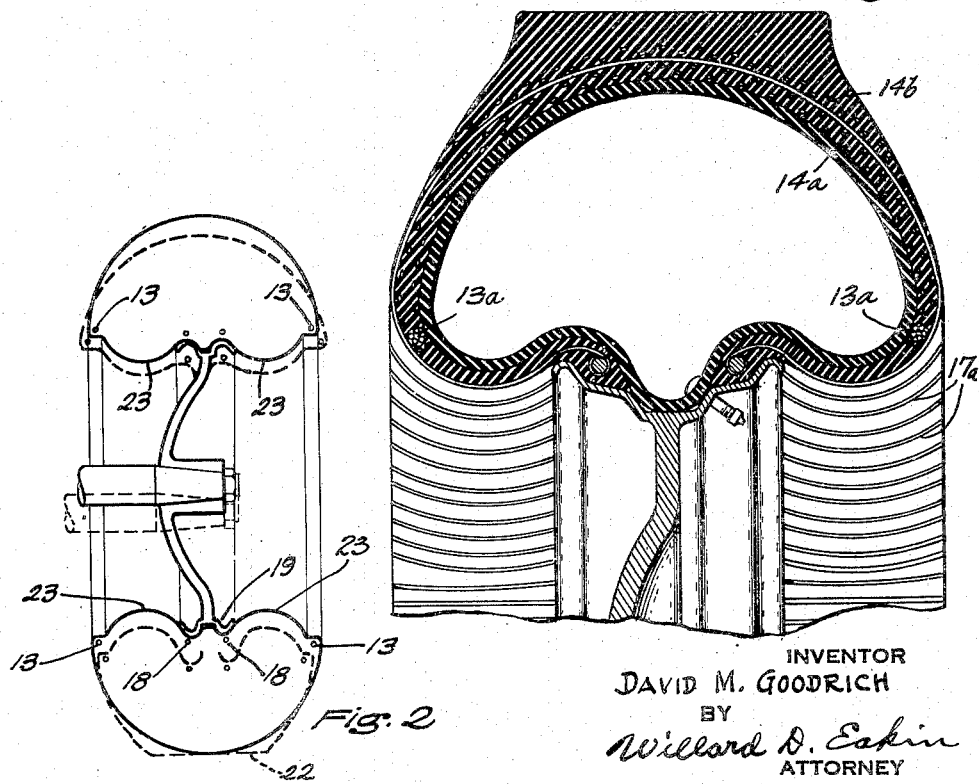
Fig. 2
Fig. 3
INVENTOR
DAVID M. GOODRICH
BY
Willard D. Eakin
ATTORNEY Patented Dec. 30, 1941

2,268,249

UNITED STATES PATENT OFFICE 2,268,249

PNEUMATIC TIRE

David M. Goodrich, Mount Kisco, N. Y.

Application April 14, 1939, Serial No. 267,834

10 Claims. (Cl. 152—330)

This invention relates to pneumatic tires and is an improvement upon the invention of my United States Patents No. 1,601,825 and No. 2,016,776.

The chief objects of my present invention are to provide a tire having a low-modulus, long-range cushioning effect; to provide a tire having cushioning action at both its outer and its inner periphery without means other than the tire itself for supporting the vehicle wheel and without over-straining of any of the material of the tire; to provide a tire of this type into which the wheel rim descends, for its cushioning action, without being strongly resisted by tension members disposed in directions unfavorable for allowing such movement; to provide a tire adapted to give direct, air-cushion support to the rim in the lower half of the wheel circle; to provide a tire adapted for effective dissipation of destructive generated heat and thus to run cool and have a long life of service; to provide a tire having cushioning action at both its outer and its inner periphery without being subject to excessive sidesway of the vehicle, as in the driving of the vehicle on a curve or on a laterally sloping roadway; to avoid such sidesway in spite of the fact that parts of the tire are reinforced with tension elements which, in the absence of torque, are all disposed in radial planes, so to speak, with relation to the axis of rotation; to provide a tire having these several advantages without radical departure from common practice in the matter of rim construction or the manner of mounting the tire on the wheel; and to provide simplicity and economy of construction.

Of the accompanying drawing:

Fig. 1 is a fragmentary radial section of a wheel and tire assembly embodying my invention in its preferred form.

Fig. 2 is a diagrammatic axial section of a wheel and tire assembly embodying my invention, illustrating the cushioning action.

Fig. 3 is a fragmentary radial section showing another embodiment.

Referring to the drawing, and at first to Fig. 1, the tire comprises an outer carcass portion 10 which is in general similar to the tire carcass of common practice in that it may have a built-up tread portion 11, and bead portions 12, 12 reinforced with preferably highly flexible but substantially inextensible endless bead cores 13, 13, which may be of metal cable or of fibrous cords, and may be referred to as "floating" rings, and the carcass portion can be and preferably is reinforced with at least two plies of the usual bias cord-fabric 14, 14.

With the carcass portion 10 and preferably vulcanized to it, and continuing past its beads and terminating in annular bead portions 15, 15, is a series of radially disposed tension elements 17, 17 which may be of high-tensile and highly flexible wire such as piano wire, or may be of fibrous cord, these tension elements extending into the bead portions 15 of the carcass and being there anchored to endless, high-tensile but flexible bead cores 18, 18, the bead portions 15, 15 being adapted to be mounted, in this particular embodiment, in a drop-center rim 19. Many modifications are possible, within the scope of the invention, however, as to the type of rim and as to the manner of anchoring the tire assembly to it, and the rubber or other material of the carcass may include a lining portion 16 within the series of radially disposed tension elements.

Within the tire is mounted the usual inner tube 20, having the usual inflating stem 21 extending through the rim.

The cushioning action of the assembly is illustrated in Fig. 2, in which the full lines illustrate the shape of the tire assembly and the relation of the parts as they are with no load upon the tire, as in case the axle is jacked up.

As the jack is removed, the tread portion of the tire flattens against the ground, as indicated by the straight dotted line at 22, concurrently with which the bead cores 13 move downward a moderate distance as indicated, and it will be manifest that the tire is adapted to give, at that position, in its outer periphery and in its sidewall action, substantially the same cushioning action that is given by the standard or ordinary type of pneumatic tire.

But in addition to this, as the wheel and tire assembly is caused to support the axle, the wheel rim 19, in the lower half of the wheel circle, and especially at its lowermost part, sinks into the inner periphery of the tire, as if it were into a pillow, the bulges 23, 23, at opposite sides of the rim, moving from their full line positions to their dotted line positions, and the bead cores 18 move downward, as indicated, a greater distance than that of the movement of the bead cores 13 of the carcass portion. It will be apparent that in the lower portion of the assembly the bulges 23 change their direction of pull upon the rim 19 to more nearly vertical directions, and that it is chiefly the change of the directions of their pull, in the lower half and in the upper half of the assembly, that determines the distance that the rim descends in finding full support from the tire.

In the upper part of the assembly also the bead cores 18 move downward a distance greater than that of the bead cores 13, and in that region the bulges 23 change the directions of their pull upon the rim 19 to directions farther from the vertical, so that they exert a less downward component of force upon the rim.

Because of the concurrent changes in the directions of pull of the bulges 23 upon the floating rings 13, the latter may move slightly outward in the upper part of the assembly and slightly inward in the lower part of the assembly, but the flexibility of the floating rings 13 compensates for such departure from their normal plane as occurs, if any, and permits them also to depart slightly from perfectly circular form in case the porportions of the assembly are such as to make such departure necessary for balancing all forces in simple tension of the several elements (principally the floating rings 13 and the transverse reinforcements 17).

In the rotation of the wheel, as each local zone of the bulges 23 passes downward at the front of the wheel and upward at the rear of the wheel, the reinforcing elements 17 are required to depart from their normal planes, because of the bead cores 18 being eccentric with relation to the bead cores 13, but because the portions of the elements 17 that are within the width of the bulge are of considerable length, and are held to a curved condition by the inflation pressure, they merely take an approximately helical form, with a distribution of their flexure throughout the width of the bulge, so that they do not have excessively localized flexure in the vicinity of their anchorages at the sides of the bulge.

To permit this action, and to avoid their being so disposed as to strongly resist the downward movement of the rim, it is important that their normal positions be directly transverse with relation to the tire, as distinguished from bias-laid or oblique tension elements, as the latter act in the manner of tent ropes or hammock ropes to resist strongly the downward movement of the rim, and thus are overstrained, prevent full cushioning action, and impose excessive distorting forces upon the floating ring members.

The oblique reinforcing elements in the carcass portion 10 are desirable, however, for transmitting the torque and avoidance of sidesway.

When wires are used for the tension elements 17 they preferably are exposed on the faces of the bulges, as shown clearly in Fig. 1, for giving off to the atmosphere, with especial effectiveness because of the rotation of the tire, the heat that is generated within the tire in service.

Sidesway of the car is strongly resisted because the side rings 13, although they are "floating" rings, are held at substantially the same elevation at all times, so that the portion of the tire that is in the region of ground contact does not have a lateral rolling movement, and lateral movement of the rim with relation to the rings 13 is limited to a very short range by shortening of the radius of curvature of the bulge toward which the rim is urged and lengthening of the radius of curvature of the other bulge. Also, in these changes in the radii of curvature of the two bulges, not only is the transverse strain in the first mentioned bulge lessened and that in the other bulge increased, in accordance with the changes of radii, but the direction of the pull of each of them upon the rim also changes, and as to both of them the change of direction of pull is such as to resist more strongly the sidesway movement, the bulge whose radius of curvature is reduced changing its pull on the rim to a direction closer to vertical and the bulge whose radius of curvature is increased changing its pull on the rim to a direction farther from vertical.

The floating rings remain substantially circular and at substantially the same elevation because they are dominated, in those respects, by the comparatively very great forces of the inflation pressure which correspond to the long radius of the longitudinal (great circle) curvature of the tire, and especially in conjunction with the oblique reinforcement elements in the carcass portion 10 of the tire.

In fact, as to rolling movement, the carcass portion 10 is substantially as stable as an ordinary tire, because it has essentially the same bias or oblique reinforcements and the bead cores 13 and the bead cores 18 are at substantially the same distance from the axle.

The construction shown in Fig. 3 is similar to that shown in Fig. 1 except that the carcass plies, 14$^a$, with their bead cores 13$^a$, are inside of the transverse reinforcing wires, 17$^a$, or the like, and the latter are exposed to the atmosphere, for cooling effect, throughout a zone extending well onto the side-wall of the tire.

In this construction the carcass also preferably comprises plies of bias cord fabric 14$^b$ external to the transverse reinforcements, in the tread region, for sustaining the torque of acceleration and of braking and for otherwise preventing excessive separation or other disarrangement of the transverse elements.

This embodiment has the advantage of a smooth exterior without the vulnerability that is represented by the shoulders formed by the bead portions 12 in Fig. 1.

It will be manifest that attainment of all of the above stated objects is provided for, and also that the invention is susceptible of other modifications within the scope of the appended claims.

I claim:

1. A pneumatic tire comprising an inflatable tire body, means holding the middle zone of its inner periphery to a substantially constant circumference, means having connection to the first said means only through flexible zones of the tire body and adapted for holding to a substantially constant circumference zones of the tire body laterally spaced from the first mentioned zone, on each side of the latter, the last mentioned circumference being shorter than the circumference of the zone would be if the tire were permitted to assume circular cross-sectional form, and reinforcing tension elements for the tire body which, in the zones between the first-mentioned and last-mentioned circumference-maintaining means, are disposed in radial, axial planes only, when the assembly is not under load.

2. A pneumatic tire comprising an inflatable tire body, means holding the middle zone of its inner periphery to a substantially constant circumference, means having connection to the first said means only through flexible zones of the tire body and adapted for holding to a substantially constant circumference zones of the tire body laterally spaced from the first mentioned zone, on each side of the latter, the last mentioned circumference being shorter than the circumference of the zone would be if the tire were permitted to assume circular cross-sectional form, and reinforcing tension elements for the tire body which, in the zones between the first-mentioned and last-mentioned circumference-maintaining means, are disposed in radial, axial planes only, when the assembly is not under load, the last mentioned zones being of such width in relation to the size of the tire body as to be pronouncedly bulged toward the axis of rotation by the inflation pressure.

3. A pneumatic tire comprising an inflatable tire body, means holding the middle zone of its inner periphery to a substantially constant circumference, means having connection to the first said means only through flexible zones of the tire body and adapted for holding to a substantially constant circumference zones of the tire body laterally spaced from the first-mentioned zone, on each side of the latter, the last mentioned circumference being shorter than the circumference of the zone would be if the tire were permitted to assume circular cross-sectional form, and reinforcing tension elements for the tire body which, in the zones between the first-mentioned and last-mentioned circumference-maintaining means, are disposed in radial, axial planes only, when the assembly is not under load, and obliquely disposed reinforcing tension elements for the tire body in its side-wall and tread portions.

4. A pneumatic tire comprising an inflatable tire body, means holding the middle zone of its inner periphery to a substantially constant circumference, means having connection to the first said means only through flexible zones of the tire body and adapted for holding to a substantially constant circumference zones of the tire body laterally spaced from the first mentioned zone, on each side of the latter, and reinforcing tension elements for the tire body which, in the zones between the circumference-maintaining means, are disposed in radial, axial planes only, when the assembly is not under load, the said tension elements being of wire and being exposed to the atmosphere in at least a part of their length.

5. A pneumatic tire comprising an inflatable tire body, means holding the middle zone of its inner periphery to a substantially constant circumference, means having connection to the first said means only through flexible zones of the tire body and adapted for holding to a substantially constant circumference zones of the tire body laterally spaced from the first mentioned zone, on each side of the latter, the last mentioned circumference being shorter than the circumference of the zone would be if the tire were permitted to assume circular cross-sectional form, and reinforcing tension elements for the tire body which, in the zones between the first-mentioned and last-mentioned circumference-maintaining means, are disposed in radial, axial planes only, when the assembly is not under load, the said tension elements being wires.

6. A pneumatic tire comprising a tread and a container which defines a single, annular air chamber having, when the tire is inflated and not under load, a portion bayed outwardly toward the tread portion substantially semi-circular in cross-section and two portions bayed inwardly away from the tread portion substantially semi-circular in cross-section, the container having annular rim-engaging portions between the inwardly bayed portions of the air chamber, and circumference-maintaining means at the outer sides of the inwardly-bayed portions, each of the bay-defining portions of the container being locally flexible substantially throughout its extent.

7. A pneumatic tire as defined in claim 6 in which the specified circumference-maintaining means have substantial local flexibility throughout their extent.

8. A pneumatic tire as defined in claim 6 in which the tire is of the open-bellied type and has air-retained rim-engaging beads.

9. A pneumatic tire comprising an inflatable tire body, means holding the middle zone of its inner periphery to a substantially constant circumference, means having connection to the first said means only through flexible zones of the tire body and adapted for holding to a substantially constant circumference zones of the tire body laterally spaced from the first mentioned zone, on each side of the latter, the last mentioned circumference being shorter than the circumference of the zone would be if the tire were permitted to assume circular cross-sectional form, and reinforcing tension elements for the tire body which, in the zones between the first-mentioned and last-mentioned circumference-maintaining means, are disposed in radial, axial planes only, when the assembly is not under load, the said tension elements extending in said planes throughout the cross-section of the tire.

10. A pneumatic tire comprising an inflatable tire body, means holding the middle zone of its inner periphery to a substantially constant circumference, means having connection to the first said means only through flexible zones of the tire body and adapted for holding to a substantially constant circumference zones of the tire body laterally spaced from the first mentioned zone, on each side of the latter, the last mentioned circumference being shorter than the circumference of the zone would be if the tire were permitted to assume circular cross-sectional form, reinforcing tension elements for the tire body which, in the zones between the first-mentioned and last-mentioned circumference-maintaining means, are disposed in radial, axial planes only, when the assembly is not under load, and obliquely disposed tension elements in the road-contacting portion of the tire.

DAVID M. GOODRICH.